United States Patent [19]

Wilke

[11] 4,347,468
[45] Aug. 31, 1982

[54] ELECTRONIC VARIABLE SPEED AUTOMOTIVE BLOWER CONTROL SYSTEM

[75] Inventor: Robert A. Wilke, Winona, Minn.

[73] Assignee: Lake Center Industries, Winona, Minn.

[21] Appl. No.: 144,339

[22] Filed: Apr. 28, 1980

[51] Int. Cl.³ .............................................. H02P 5/16
[52] U.S. Cl. .................................. 318/331; 318/139; 318/317; 307/10 R
[58] Field of Search ............... 318/334, 471, 472, 473, 318/474, 139, 331, 317; 307/10 R; 123/41.11, 41.12

[56] References Cited

U.S. PATENT DOCUMENTS

| | | | |
|---|---|---|---|
| 3,396,323 | 8/1968 | Auld | 318/334 |
| 3,422,331 | 1/1969 | Kearns | 318/331 |
| 3,517,291 | 6/1970 | Carruth | 318/341 |
| 3,921,004 | 11/1975 | Stark et al. | 307/10 R |
| 4,008,426 | 2/1977 | Ogura | 318/331 |
| 4,044,287 | 8/1977 | Ratzel | 318/332 |
| 4,168,456 | 9/1979 | Isobe | 318/471 |

Primary Examiner—David Smith, Jr.
Attorney, Agent, or Firm—Kinzer, Plyer, Dorn & McEachran

[57] ABSTRACT

This is concerned with an electronic variable speed blower control system primarily used for automotive installations which provides light gauge wiring between a potentiometer on or in the dashboard and infinitely variable speeds are acquired in the blower unit.

4 Claims, 5 Drawing Figures

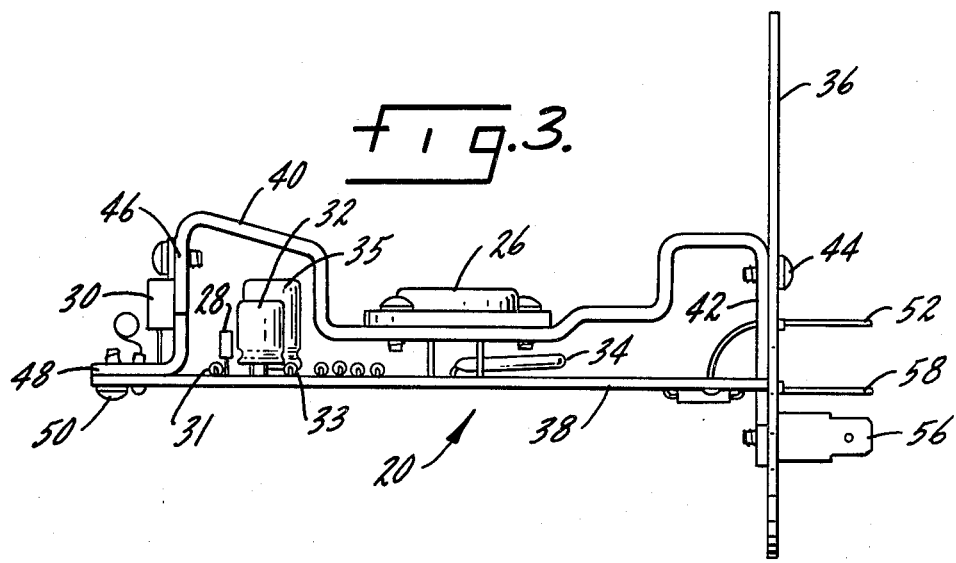
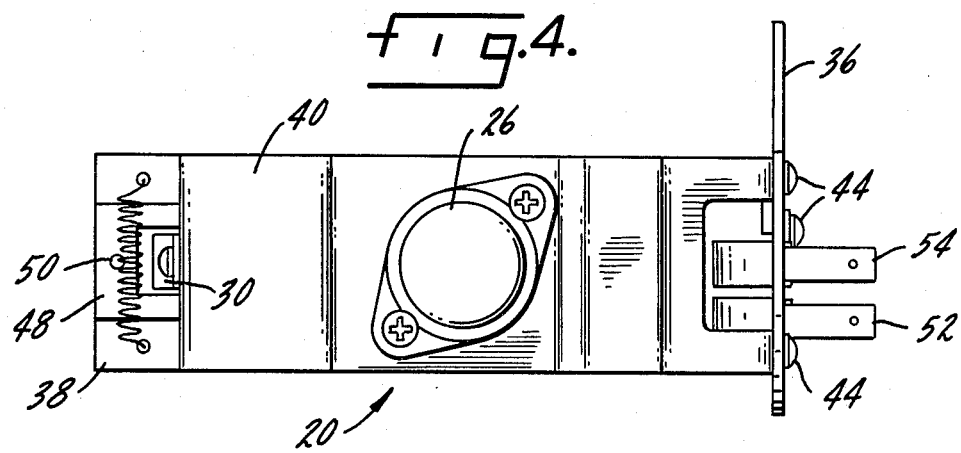
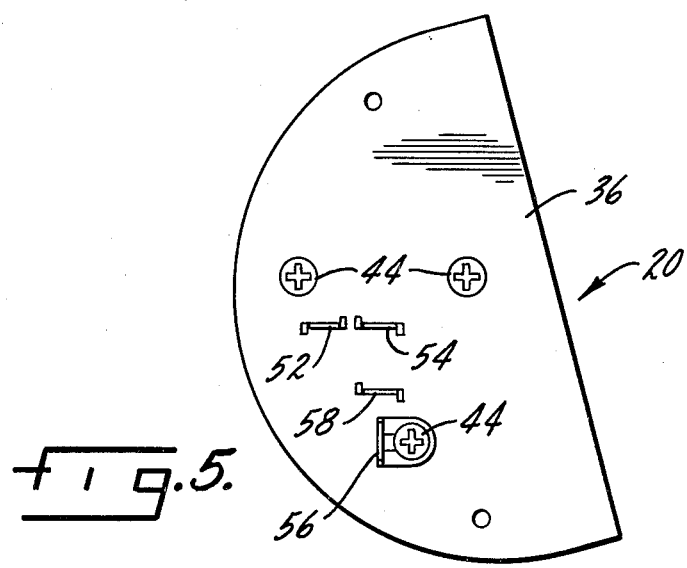

ELECTRONIC VARIABLE SPEED AUTOMOTIVE BLOWER CONTROL SYSTEM

SUMMARY OF THE INVENTION

This invention is concerned with an electronic variable speed automotive blower control system which provides an infinitely variable speed for the blower motor in a heating and/or cooling system for automobile use.

A primary object is a system which provides light gauge wire between the potentiometer on the dashboard and an electronic module in the blower plenum which greatly reduces the wiring harness or bulk between the potentiometer and the module.

Another object is a system of the above type which provides an infinitely variable speed for the blower motor.

Another object is an electronic module unit that is quite inexpensive which is to say that it is cost-effective.

Another object is a system of the above type which can be made to easily fit into existing panels and ducts.

Another object is a circuit of the above type which is stabilized against oscillations.

Another object is a circuit of the above type that will not be influenced or affected by high voltage transients.

Other objects will appear from time to time in the ensuing specification and drawings.

BRIEF DESCRIPTION OF THE DRAWINGS

FIG. 3 is a side view of the control module;
FIG. 4 is a top view of FIG. 3;
and
FIG. 5 is a end view of FIG. 3.

DESCRIPTION OF THE PREFERRED EMBODIMENTS

Figure 1:
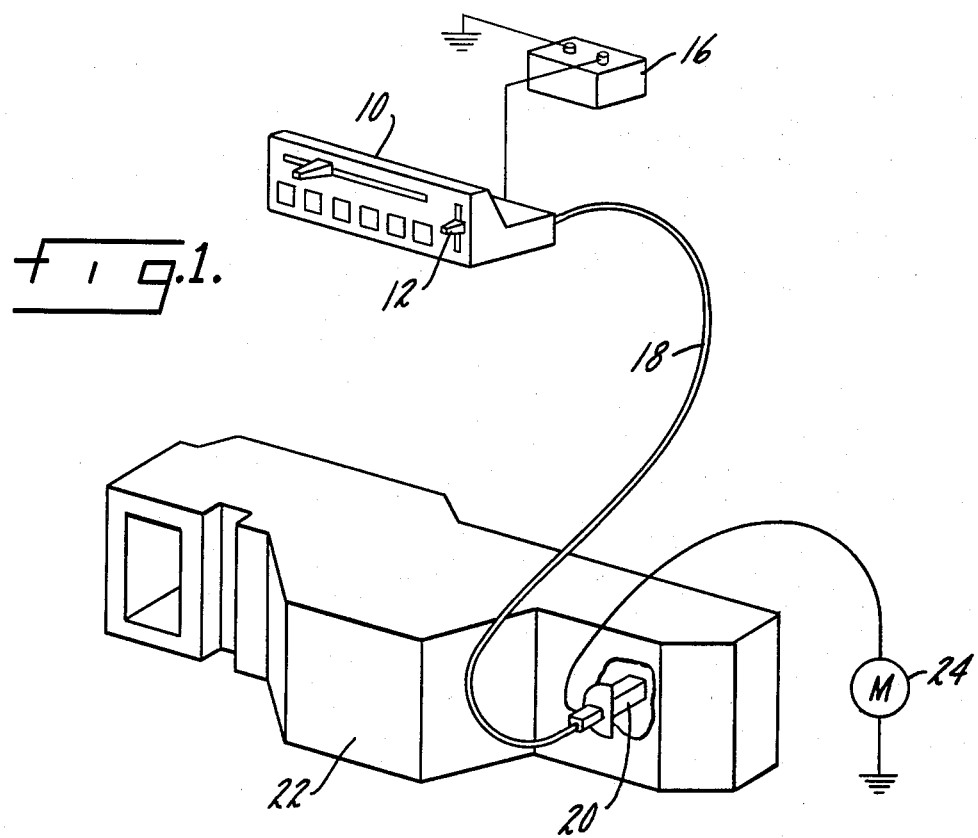
FIG. 1 is a diagrammatic perspective of the control and certain parts of the automobile.
Figure 2:
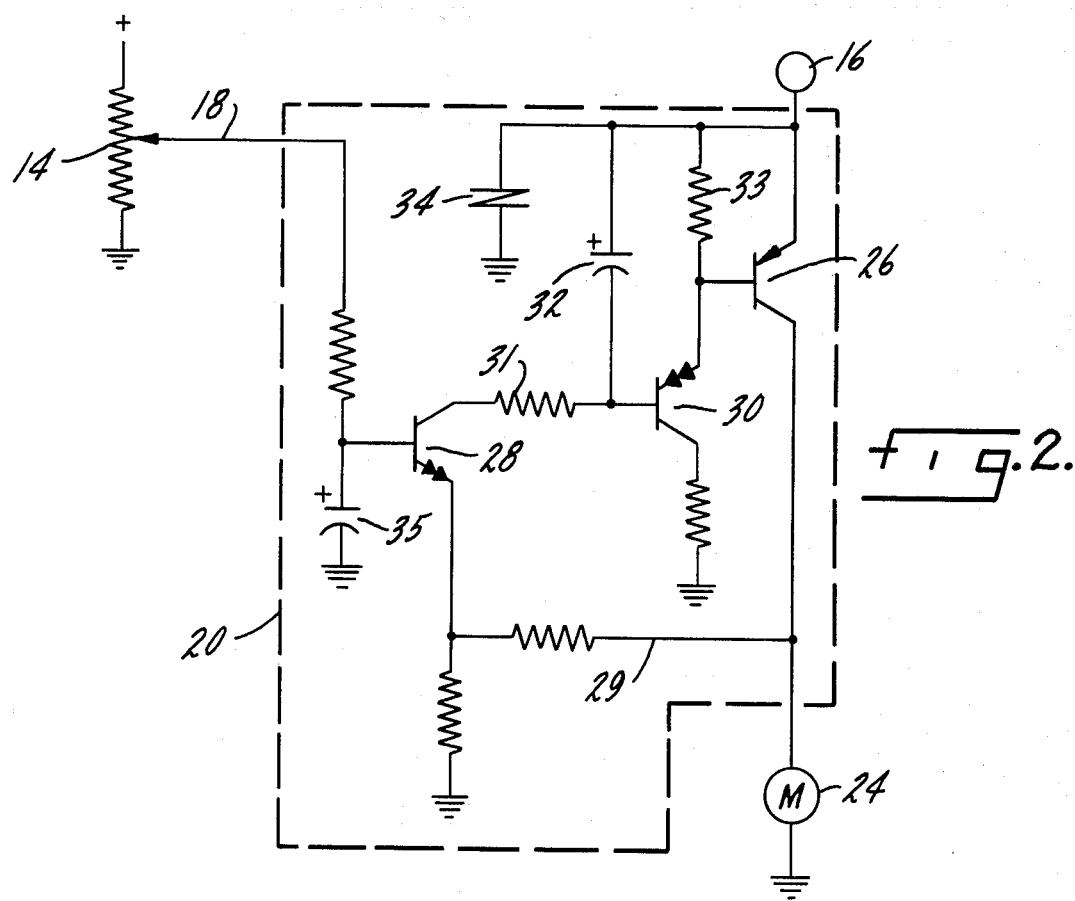
FIG. 2 is a circuit diagram.

In FIG. 1 a control is indicated generally at 10 and may be considered to be a mode control assembly which includes a fan speed potentiometer control lever 12 which controls the setting of potentiometer 14, in FIG. 2, which is connected to the battery or power source 16. The potentiometer is connected by light gauge wiring 18 to a variable blower control module 20 shown positioned in the plenum or duct 22 of what may be considered to be a conventional or standard automobile heating and/or air conditioning system, the module 20 being designated by the broken outline in FIG. 2. The circuit itself, to be described in detail hereinafter, controls the voltage supply between the power source and the blower motor 24.

The module itself includes a power transistor 26 between the battery and the blower motor with a voltage comparator circuit and amplifier arrangement that includes two transistors 28 and 30. The voltage from the dashboard potentiometer 14 is brought to the base of the first transistor 28 which is an NPN transistor of high amplification, and the voltage on the base turns it on. Voltage comparison takes place through the connection 29. If the voltage from the potentiometer 14 is higher than the output voltage from the power transistor 26 to the blower motor 24, the comparator transistor 28 will be turned on which in turn apply a voltage to the base of transistor 30 through a resistance 31. This turns on the second transistor 30 which is a Darlington connected transistor, with high amplification. This in turn allows more current through the power transistor 26. If the voltage from the potentiometer 14 is lower, the comparator transistor 28 will be turned off which in turn turns off the second transistor 30 and the power transistor 26 allowing less current to the blower motor 24. The two transistors 28 and 30 are an amplifying arrangement so that a small current from the potentiometer 14 may control a large current from the battery to the blower motor through the power transistor 26.

A capacitance 32 is connected between the power input from the battery 16 and the transistors 28 and 30 to stabilize the system against oscillation. A closed loop can cause oscillation and this capacitor stabilizes against oscillation.

In an automobile you may have various high transient voltages and a transient absorber 34 is connected in the circuit so that any high voltage transients will be absorbed. Also an input filter 35 may be used.

The transistors 26, 28 and 30 plus the capacitance 32 make up or constitute an amplifier circuit while the connection 29 with the resistors shown in conjunction with transistors 28 make up a voltage comparator. A resistance 33 is provided to supply enough current so that the voltage on the base of power transistor 26 is high enough to keep it turned off in opposition to leakage currents through transistor 30.

The specific package for the circuit which is the module 20 is shown in FIGS. 3 through 5 and may include a terminal board 36 which may be made of fiberglass and has a printed circuit board 38 connected thereto by a stamped aluminum bracket 40 which functions as a heat sink as explained hereinafter. At one end of the bracket 40 is a depending leg 42 which is connected to the terminal board 36 be a series of screws 44 or the like, but it may be otherwise. The other end of the bracket has a depending leg 46 with an angle 48 that may be connected to the other end of the circuit board by a screw 50 or the like. A cavity is defined between the circuit board and the bracket which contains most of the electronic parts. The power transistor 26 is mounted on the bracket 40 so that the bracket will function as a heat sink. The power transistor is not isolated from the heat sink whereas the other two transistors 28 and 30 are. Various contacts in the form of blades may extend from the face of the terminal board for example 52 to the battery, 54 to the potentiometer 12 and 56 to the blower motor 24 with a ground connection 58 although the specific arrangement may be widely varied.

After all of the components are in place and the heat sink bracket 40, terminal board 36 and circuit board 38 assembled, the entire module may be dipped into a conformal coating, the outer ends 48 first and up to and including the terminal board 36 but not the blades 52–58 so that the entire unit may be sealed against moisture which is present in an automobile plenum.

The use, operation and function of the invention are as follows:

One of the primary purposes is to provide an infinitely variable speed for the blower motor in an automobile heating and/or cooling system. Previously the speed control has been on a two or three step basis which can upset or be inconsistent with the more sophisticated heating and cooling system. By using and providing a variable speed unit, the setting can be fine tuned to the comfort of the passengers.

The present arrangement has the advantage that quite light gauge wires can extend between the potentiometer on the dashboard and the control module since the current from the potentiometer may be quite low. The blower control module 20 is positioned in the plenum which will cool the power transistor 26, mounted on the heat sink 40, which tends to get hot.

One of the important aspects of the invention is the voltage comparison function performed by the connection 29 which is a feedback of the voltage from the power transistor to the first amplifying transistor 28. In a sense the transistors 26, 28 and 30 all function as an amplifier which is controlled by the voltage difference between the input at 18 and the result at 29.

The control module itself is in the form of an inexpensive package which can be mounted in the opening in existing plenums and is sealed against water and moisture.

While the preferred form and several variations of the invention have been shown and described, it should be understood that suitable additional modifications, changes, substitutions and alterations may be made without departing from the invention's fundamental theme.

The embodiments of the invention in which an exclusive property or privilege is claimed are defined as follows:

1. In a control for use with a blower motor in a heating and/or cooling system for a car or the like, a manually operable potentiometer to provide a variable voltage and adapted to be connected to the car battery, a circuit from the potentiometer including a power transistor adapted to be connected between the car battery and the blower motor, and being the only element that drops voltage therebetween, and a voltage comparator arranged to compare the voltage from the potentiometer to the output voltage from the power transistor including a transistor with its collector connected to ground and its emitter connected to the power transistor so as to turn on the power transistor if the potentiometer voltage is higher than the power transistor output voltage and to turn off the power transistor if the potentiometer voltage is lower than the power transistor output voltage.

2. The control of claim 1 in which the circuit includes an amplifier between the potentiometer and the power transistor.

3. The control of claim 2 in which the amplifier includes a transient surge absorber for absorbing transient voltages.

4. The control of claim 2 in which the amplifier includes a stabilizer capacitance for preventing oscillations.

* * * * *